Figure 1:
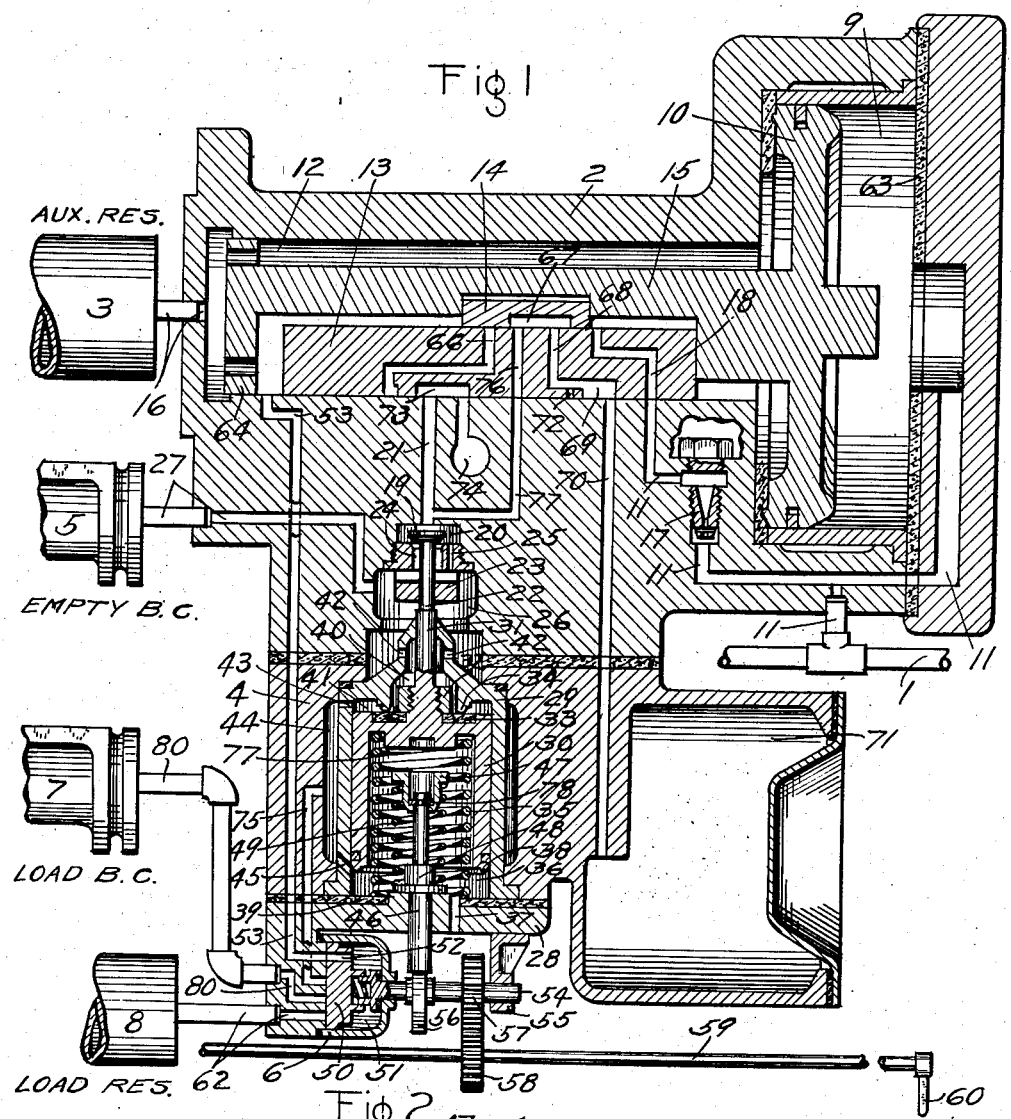

Jan. 1, 1935. W. E. DEAN 1,986,464
EMPTY AND LOAD BRAKE
Filed Oct. 21, 1933

INVENTOR
WILLIAM E. DEAN
BY *Wm. M. Cady*
ATTORNEY

Patented Jan. 1, 1935

1,986,464

UNITED STATES PATENT OFFICE 1,986,464

EMPTY AND LOAD BRAKE

William E. Dean, Hamilton, Ontario, Canada, assignor to The Westinghouse Air Brake Company, Wilmerding, Pa., a corporation of Pennsylvania Application October 21, 1933, Serial No. 694,612

24 Claims. (Cl. 303—23)

This invention relates to fluid pressure braking apparatus, and more particularly to the empty and load type comprising a triple or other brake controlling valve device adapted to effect an application of the brakes by the supply of fluid under pressure to the empty brake cylinder or to both the empty and load brake cylinders of the apparatus, first at a fast rate to cause a rapid application of the brake shoes to the treads of the car wheels, and then at a slower rate to cause a gradual building up of the desired brake cylinder pressure.

Brake controlling valve devices of this character, as heretofore proposed, comprise a valve interposed in the path of the flow of fluid to the brake cylinder or cylinders, which valve is normally maintained in its open position by a piston or other form of abutment subject on one side to a controlling pressure such as the pressure of a spring or the pressure of fluid. The opposite side of the piston or abutment is arranged to be subject to brake cylinder pressure, so that as soon as this pressure has been increased to a value sufficient to overcome the pressure of the spring or fluid acting on the other side, the piston or abutment is moved to permit the closure of the valve. These brake controlling valve devices function in such a manner in effecting an application of the brakes, that the brake cylinder pressure obtained during the period of time the inshot valves remain open will be the same regardless of whether or not the devices have been conditioned for empty or loaded car operation.

I have found that, instead of rapidly increasing the brake cylinder pressure to the same value in empty and loaded car operation, as is the case when the above mentioned proposed brake controlling valve devices are employed, a greatly improved braking action will be produced when, in loaded car operation the brake cylinder pressure resulting from the inshot of fluid under pressure to the brake cylinder is greater than the brake cylinder pressure obtained in empty car operation. In a train which comprises both empty and loaded cars, I have found that by initially braking each car in keeping with its empty or loaded weight, a substantially uniform initial braking effect throughout the length of the train will be produced, thus contributing materially to the gentle gathering of the slack in the train.

With this in view, the principal object of my invention is to provide an empty and load fluid pressure brake apparatus having means whereby the amount of inshot of fluid under pressure may be varied to provide a higher initial brake cylinder pressure in loaded car operation than in empty car operation and another feature resides in the means included in the apparatus operative to provide the higher initial brake cylinder pressure in loaded car operation upon the same amount of reduction in brake pipe pressure required to provide the lower initial brake cylinder pressure in empty car service.

Another object is to provide improved means for conditioning an empty and load fluid pressure brake apparatus for either empty or loaded car operation.

Other objects and advantages will appear in the following more detailed description of the invention.

Figure 2:
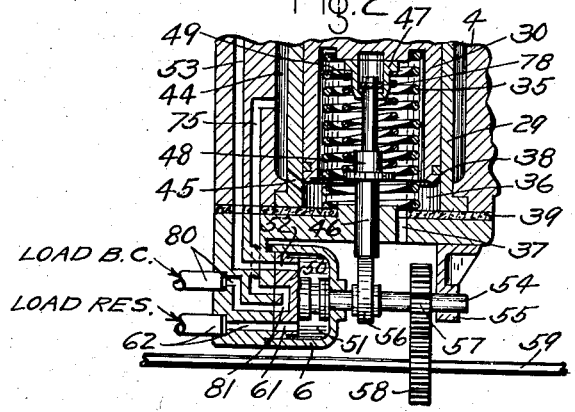

In the accompanying drawing: Fig. 1 is a diagrammatic view, mainly in section, of an empty and load fluid pressure brake apparatus embodying my invention, the apparatus being shown in condition for empty car operation; and Fig. 2 is a fragmentary sectional view, mainly in section, illustrating the manner of adjusting the apparatus for loaded car operation.

As shown in the drawing, the empty and load fluid pressure brake apparatus may comprise a brake pipe 1, a triple valve device 2, an auxiliary reservoir 3, an inshot valve mechanism 4, an empty brake cylinder 5, an empty and load change-over valve device 6, a load brake cylinder 7, and a supplemental or load reservoir 8.

The triple valve device 2 may comprise a casing having the usual piston chamber 9 containing a piston 10 and communicating with the brake pipe 1 through a passage 11, and also having a valve chamber 12 containing a main slide valve 13 and an auxiliary slide valve 14 adapted to be actuated by the stem 15 of the piston 10, said valve chamber communicating with the auxiliary reservoir 3 through a passage and pipe 16. With the triple valve parts in release position, the brake pipe 1 and piston chamber 9 are in communication with the auxiliary reservoir 3 by way of passage 11, the passage in a choke plug 17 interposed in the passage, and a port 18 in the main slide valve 13.

The inshot valve mechanism is mounted in the casing of the triple valve device 2 and comprises a normally open controlling or inshot valve 19 contained in a chamber 20 which is in communication with a passage 21 leading from the seat of the main slide valve 13. The valve 19 is provided with a stem 22 which is slidably guided in a valve seat member 23 having screw-threaded connection with the casing. The valve seat member is provided with passages 24 and 25 through which the valve chamber 20 is adapted to communicate with a chamber 26 which is in communication through a passage and pipe 27 with the empty brake cylinder 5. The passage 24 has a comparatively large flow area, so as to permit the initial inshot of fluid under pressure to the empty brake cylinder, whereas the flow area of the passage 25 is smaller, so as to provide for the gradual increase in the empty and load brake cylinders 5 and 7, respectively, upon the operation of the valve 19 to close off the flow of fluid through the passage 24.

Also contained in the casing and securely clamped thereto by a cover plate 28 is a tubular bushing 29 within which a valve piston 30 is slidably mounted. The valve piston is provided at one end with a stem 31 which is adapted to operatively engage the end of the valve stem 22, and through the medium of these interengaging stems, the valve piston is adapted to control the operation of the inshot valve 19. Secured to the stem end of the valve piston by means of a nut 32, having screw-threaded connection with the stem, is a gasket 33 which is normally maintained seated on an annular seat rib 34, carried by the bushing 29, by a spring 35 which is interposed between and engages the cover plate 28 and valve piston; and which is contained in a chamber 36 open through a passage 37 to the atmosphere. The other end of the valve piston is provided with an annular rib 38 which is adapted to seat on a gasket 39, interposed between the cover plate 28 and the casing, to prevent leakage of fluid from the stem side of the valve piston to the chamber 36 and consequently to the atmosphere.

With the gasket 33 in engagement with the seat rib 34, the valve piston and bushing 29 define chambers 40 and 41, the chamber 40 being open to the chamber 26 through ports 42 in the bushing, and the chamber 41 being normally open to the atmosphere by way of a passage 43 in the bushing 29, a chamber 44, a port 45 in the bushing 29, chamber 36 and passage 37. The chamber 44 is in open communication with a passage 75 leading to the rotary valve seat of the change-over valve device 6.

Contained in the chamber 36 and surrounded by the coils of the spring 35 is a spring assemblage which is movable either into or out of operative engagement with the valve piston 30. This spring assemblage comprises a stem 46 which passes through an opening in the cover plate 28 and which is slidably guided within the opening by the plate, the outer end of the stem extending beyond the outer surface of the plate. The inner end of the stem has slidably secured thereto by a removable key or stop 78, a head or spring seat 47 which is adapted to be moved either into or out of operative engagement with the valve piston. Also secured to the stem 46, in spaced relation to the spring seat 47, is a spring seat 48 having a flange which is adapted to engage the inner face of cover plate 28 and thereby limit the outward movement of the stem. Interposed between and engaging the spring seats 47 and 48 is a control spring 49.

The empty and load change-over valve device 6 may comprise a rotary valve 50, at one side of which there is a chamber 51 to which the triple valve piston chamber 12 and consequently the auxiliary reservoir is connected by way of a port 52 in the rotary valve and a passage 53.

The rotary valve is adapted to be actuated by a valve stem or shaft 54 which is journalled adjacent its inner end in the cap portion of the casing of the valve device 6. The outer end of the shaft is journalled in a bracket 55 which is carried by the cover plate 28.

For the purpose of positioning the spring assemblage for either empty or loaded car operation, a cam 56 is provided which is rigidly secured to the rotatable shaft 54 of the changeover valve device 6 and which operatively engages the outer end of the stem 46 of the spring assemblage.

Also secured to the shaft 54 is a gear wheel 57 which is adapted to be driven by a pinion or gear wheel 58 secured to a rotatable operating shaft 59, which shaft 59 may be provided at each end with an operating handle 60 as shown in Fig. 1, said handle being located where it is readily accessible to a trainman.

Initial charging of the apparatus

With the several parts of the apparatus in release position, as shown in Fig. 1, fluid under pressure supplied to the brake pipe 1 in the usual manner flows to the piston chamber 9 of the triple valve device through pipe and passage 11 and also to the valve chamber 12 and connected auxiliary reservoir 3 by way of passage 11, choke plug 17 and port 18 in the main slide valve 13. Fluid under pressure supplied to the valve chamber 12 not only flows to the auxiliary reservoir 3, but also flows by way of passage 53 and port 52 in the rotary valve 50 to the valve chamber 51 of the change-over valve device 6.

If the change-over valve device is in loaded position, as shown in Fig. 2, fluid under pressure supplied to the rotary valve chamber 51 flows through a port 61 in the rotary valve and a passage and pipe 62 to the load reservoir 8. With the change-over valve device in empty position as shown in Fig. 1, the rotary valve 50 laps the passage 62 so that fluid under pressure from the valve chamber 51 to the load reservoir 8 is not permitted. It will thus be seen that with the change-over valve device 6 in empty position, the slide valve chamber 12 of the triple valve device, auxiliary reservoir 3 and rotary valve chamber 51 will be charged with fluid to the pressure normally carried in the brake pipe, and that with the change-over valve device in loaded position, the load reservoir 8 as well as the valve chamber 12, auxiliary reservoir 3 and rotary valve chamber will be charged to the pressure normally carried in the brake pipe.

Operation of the apparatus when conditioned for empty car operation

Assuming that the apparatus is conditioned for empty car operation as shown in Fig. 1, and it is desired to effect an application of the brakes, a reduction in brake pipe pressure is made in the usual manner, which causes a corresponding reduction in the pressure of fluid in the triple valve piston chamber 9 to take place. Upon a reduction in the pressure of fluid in the chamber 9, fluid at auxiliary reservoir pressure in the triple valve slide valve chamber 12 causes the piston 10 to move outwardly to application position in which the outer face of the piston engages a gasket 63 mounted in the triple valve casing. As the piston thus moves it initially shifts the auxiliary slide valve 14 relative to the main slide valve 13 until a lug 64 carried by the piston stem 15 engages the rear end of the main slide valve, after which the auxiliary and main slide valve are moved in unison by the piston to application position.

The auxiliary slide valve 14, as it is moved relative to the main slide valve 13, first laps the port 18 in the main slide valve, thus preventing back flow of fluid from the valve chamber 12 and auxiliary reservoir 3 to the brake pipe and then uncovers the usual service port 66 in the main slide valve. At substantially the same time as the service port is being uncovered, a cavity 67 in the auxiliary slide valve connects the port 18 to a port 68 in the main slide valve, which port 68 leads to a foot cavity 69 which is open to a passage 70 leading to a quick service chamber 71. With the ports 18 and 68 thus connected, fluid under pressure flows from the brake pipe to the quick service chamber 71, thus initiating a local quick service reduction in brake pipe pressure.

When the auxiliary slide valve 14 has uncovered the service port 66 and established the quick service communication from the brake pipe to the quick service chamber 71, the lug 64 on the piston stem 15 engages and causes the main slide valve 13 to move to application position, in which the service port 66 is open to the passage 21 and the cavity 69 and a restricted port 72 establishes a final quick service communication from the passage 11 to the passage 70.

With the service port 66 open to the passage 21, fluid under pressure flows from the slide valve chamber 12 and connected auxiliary reservoir 3 to the empty brake cylinder 5 by way of port 66, passage 21, inshot valve chamber 20, past the unseated inshot valve 19, passage 24, chamber 26 and passage and pipe 27. From the chamber 20 fluid may also flow through the restricted passage 25 to the chamber 26. Fluid under pressure supplied to the chamber 26 besides flowing to the brake cylinder 5, also flows through the openings 42 in the bushing to the chamber 40, so that the portion of the face of the stem portion of the valve piston 30 which is exposed to the chamber 40 is subject to the action of fluid at brake cylinder pressure.

Now when the brake cylinder pressure has been increased to around ten pounds, fluid at this pressure in chamber 40 causes the valve piston 30 to move against the resistance of the spring 35 to its extreme outer position in which the gasket 33 is out of engagement with the seat rib 34 and the rib or valve 38 is in sealing engagement with the gasket 39, the valve piston in its initial movement unseating the gasket 33 and closing communication from the chamber 44 to the chamber 36 by way of port 45.

As the valve piston is thus moved, the inshot valve 19 seats on the valve seat member 23 and closes off the rapid flow of fluid to the brake cylinder 5 by way of the passage 24. The flow of fluid to the brake cylinder 5 is now at a slow or gradual rate by way of the passage 25.

*Release of the brakes with the apparatus conditioned for empty car operation*

When it is desired to release the brakes, the brake pipe pressure and consequently the pressure of fluid in the triple valve piston chamber is increased in the usual manner. The increase in the pressure of fluid in the piston chamber 9 causes the triple valve piston 10 and associated parts to move from application to release position as shown in Fig. 1. In release position fluid under pressure flows from the brake cylinder to the atmosphere by way of pipe and passage 27, chamber 26, passages 24 and 25, past the inshot valve 19, the fluid in passage 24 lifting the valve 19 from its seat, passage 21, a cavity 73 in the main slide valve 13 and a passage 74 leading to the atmosphere.

When fluid under pressure has been almost completely vented from the brake cylinder 5, the spring 35 acts to move the valve piston 30 inwardly to its normal position in which the gasket 33 seats on the seat rib 34 and in which the stem 31 of the valve piston engages and maintains the inshot valve 19 unseated as shown in Fig. 1 of the drawing.

With the triple valve parts in release position, the auxiliary reservoir 3 and slide valve chamber 12 of the triple valve device are recharged by the flow of fluid from the brake pipe 1 by way of pipe and passage 11 and port 18 in the main slide valve 13.

Further with the triple valve parts in release position, fluid under pressure is vented from the quick service chamber 71 by way of passage 70, cavity 69 and port 68 in the main slide valve 13, cavity 67 in the auxiliary slide valve 14, a port 76 in the main slide valve, a passage 77, passage 21, cavity 73 in the main slide valve and passage 74.

*Operation of the apparatus when conditioned for loaded car operation*

When it is desired to condition the apparatus for loaded car operation, a trainman by the use of the handle 60 rocks the shaft 59 a predetermined distance in a counter-clockwise direction which causes the meshing gear wheels 58 and 57 to impart a clockwise rotary movement to the stem 54 and thereby to the change-over rotary valve 50 and cam 56.

The cam 56, as it is thus moved, forces the stem 46 and other parts of the spring assemblage associated with the stem inwardly as a unit until the spring seat 47 engages the inner face 77 of the valve piston 30, when the continued movement of the cam causes the stem 46 and spring seat 48 to move inwardly relative to the spring seat 47, causing the spring 49 to be compressed slightly and providing a clearance space between the adjacent faces of the stop 78 and spring seat 47. By reason of this the spring seat will automatically move inwardly and remain in operative engagement with the valve piston as the gasket 33 wears. It will be observed that the valve piston is now subject on the one side to the action of springs 35 and 49 and that therefore a greater brake cylinder pressure is required to move the piston outwardly than is required when the valve piston is subject only to the pressure of the spring 35.

With the spring assemblage in its proper operative position, the rotary valve 50 of the change-over valve device 6 is in its loaded position, in which position, as shown in Fig. 2, the load reservoir 8 is charged with fluid at auxiliary reservoir pressure by way of slide valve chamber 12, passage 53, port 52 in the rotary valve 50, rotary valve chamber 51, port 61 in the rotary valve and passage and pipe 62. With the rotary valve in this position and the valve piston 30 in its innermost position, as shown, the load brake cylinder 7 is open to the atmosphere by way of a pipe and passage 80, a cavity 81 in the rotary valve, passage 75, chamber 44, port 45 in the bushing 29, chamber 36 and passage 37.

When it is desired to effect an application of the brakes, the brake pipe pressure is reduced in the usual manner which causes the several parts of the triple valve device to function to effect a quick service reduction in brake pipe pressure and to supply fluid under pressure to the empty brake cylinder 5 in the same manner as hereinbefore described in connection with the effecting of an application of the brakes with the apparatus conditioned for empty car operation.

Now when the brake cylinder pressure has been increased to around twenty pounds, fluid at this pressure in chamber 40 causes the valve piston 30 to move to its outermost position against the opposing pressures of the springs 35 and 49, the valve piston in its traverse unseating the gasket 33, lapping the port 45 and finally seating the annular rib 38 on the gasket 39. As the valve piston thus moves it permits the inshot valve to close so that the further flow of fluid from the chamber 20 to the chamber 26 is by way of the passage 25 of small flow area.

With the valve piston in its outer position, fluid under pressure supplied to the chamber 26 flows past the valve piston to the load brake cylinder 7 by way of passage 43 in the bushing 29, chamber 44, passage 75, cavity 81 in the change-over rotary valve 50 and passage and pipe 80. It will be noted that when the valve piston moves away from the seat rib 34, the empty brake cylinder pressure will equalize into the load brake cylinder 7, after which the pressure of both brake cylinders is gradually increased by the restricted flow of fluid through the passage 25. It will here be understood that upon the equalization of the empty brake cylinder pressure into the load brake cylinder 7, the reduced pressure resulting from such equalization and acting over the entire area of the base of the stem side of the valve piston 30 is sufficient to maintain the valve piston in its outer position against the opposing force of the springs 35 and 49.

*Release of the brakes with the apparatus conditioned for loaded car operation*

When the brake pipe pressure is increased to release the brakes, the triple valve parts move to release position, in which fluid under pressure is vented from the quick service reservoir 71 to the atmosphere, the auxiliary reservoir 3 is recharged with fluid under pressure from the brake pipe and fluid under pressure is vented from the empty brake cylinder 5 to the atmosphere, all in substantially the same manner as hereinbefore described in connection with the release of the brakes with the apparatus conditioned for empty car operation.

Fluid under pressure supplied to the valve chamber 12 of the triple valve device flows to the load reservoir 8 through passage 53, port 56 in the change-over rotary valve, rotary valve chamber 51, port 61 in the rotary valve and passage and pipe 62, thus charging the reservoir to the pressure carried in the brake pipe and auxiliary reservoir.

Fluid under pressure flows from the load brake cylinder 7 to the atmosphere by way of pipe and passage 80, cavity 81 in the change-over rotary valve, passage 75, chamber 44, passage 43 in the bushing 29, past the unseated valve piston 30, openings 42 in the bushing 29, chamber 26 and the atmospheric communication leading from the chamber 26.

Now when fluid under pressure has been almost completely vented from the empty and load brake cylinders 5 and 7, respectively, the springs 35 and 49 act to move the valve piston 30 to its innermost or normal position, closing communication from the load brake cylinder 7 to the chamber 26 and uncovering the port 45 in the bushing 29. With the port 45 uncovered, fluid under pressure is completely vented from the load brake cylinder 7 to the atmosphere by way of said port, chamber 36 and passage 37. The complete venting of fluid from the empty brake cylinder 5 is by way of the chamber 26 and the communication leading from said chamber to the atmosphere.

When it is desired to again condition the apparatus for empty car operation, the trainman, by the use of the handle 60 rocks the shaft 59 in a clockwise direction, causing the shaft 54 and thereby the cam 56 and change-over rotary valve 50 to move to the position in which they are shown in Fig. 1 of the drawing.

As the cam 56 is being moved to this position, the movable spring assemblage controlled thereby will, in the present embodiment of the invention, move outwardly by the force of gravity to the position in which it is shown in Fig. 1. With the movable spring assemblage in this position, the valve piston 30 is subject only to the pressure of the spring 35.

*Utility of the load reservoir*

The load reservoir is so proportioned that when an application of the brakes is initiated with the apparatus conditioned for loaded car operation, the supply of fluid under pressure from the reservoir will prevent the inshot of fluid to the brake cylinder from reducing the pressure of the triple valve chamber 12 below that obtaining in the chamber upon the inshot of fluid to the brake cylinder with the apparatus conditioned for empty car operation, so that the desired amount of inshot of fluid to the brake cylinder will be obtained upon the same degree of brake pipe reduction as is required to effect an application of the brakes with the apparatus conditioned for empty car operation.

From the foregoing description it will be apparent that when the fluid pressure brake apparatuses on the empty cars of a train are conditioned for empty car operation and those on the loaded cars are conditioned for loaded car operation, a reduction in brake pipe pressure will cause the apparatuses on the empty cars to function to close off the inshot of fluid under pressure to the brake cylinder when the brake cylinder pressure has been increased to around ten pounds, and will also cause the apparatuses on the loaded cars to function to close off the inshot of fluid under pressure to the brake cylinder when the brake cylinder pressure has been increased to around twenty pounds, thus the inshot brake cylinder pressure values, in keeping with the empty and loaded weights of the cars, are insured, and as a result the initial retarding action on the cars will be more nearly uniform throughout the length of the train.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In an empty and load fluid pressure brake equipment, the combination with a brake cylinder, a brake pipe, and a valve device operated upon a reduction in brake pipe pressure for supplying fluid under pressure to the brake cylinder, of means operable to condition the equipment for either empty or load braking, valve means for controlling the rate of flow of fluid to the brake cylinder to provide an initial fast rate of flow of fluid to the brake cylinder and then a slower rate of flow of fluid to the brake cylinder, said valve means being operable by brake cylinder pressure, and means operable upon the operation of the first mentioned means in conditioning the equipment for empty braking to render said valve means responsive to a certain brake cylinder pressure and operable upon the operation of the first mentioned means in conditioning the equipment for load braking to render said valve means responsive to a different brake cylinder pressure.

2. In an empty and load fluid pressure brake equipment, the combination with a brake cylinder, a brake pipe, and a valve device operated upon a reduction in brake pipe pressure for supplying fluid under pressure to the brake cylinder, of means operable to condition the equipment for either empty or load braking, valve means for controlling the rate of flow of fluid to the brake cylinder to provide an initial fast rate of flow of fluid to the brake cylinder and then a slower rate of flow of fluid to the brake cylinder, said valve means being operable by brake cylinder pressure, and means operable upon the operation of the first mentioned means in conditioning the equipment for empty braking to render said valve means responsive to a certain brake cylinder pressure and operable upon the operation of the first mentioned means in conditioning the equipment for load braking to render said valve means responsive only to a higher brake cylinder pressure.

3. In an empty and load fluid pressure brake equipment, the combination with a brake cylinder, a brake pipe, and a valve device operated upon a reduction in brake pipe pressure for supplying fluid under pressure to the brake cylinder, of means operable to condition the equipment for either empty or load braking, valve means for controlling the rate of flow of fluid to the brake cylinder to provide an initial fast rate of flow of fluid to the brake cylinder and then a slower rate of flow of fluid to the brake cylinder, said valve means being operable by brake cylinder pressure, and means operable upon the operation of the first mentioned means in conditioning the equipment for empty braking to render said valve means responsive to a certain relatively low brake cylinder pressure and operable upon the operation of the first mentioned means in conditioning the equipment for load braking to render said valve means responsive only to a higher brake cylinder pressure.

4. In an empty and load fluid pressure brake equipment, the combination with a brake cylinder, a brake pipe, and a valve device operated upon a reduction in brake pipe pressure for supplying fluid under pressure to the brake cylinder, of means operable to condition the equipment for either empty or load braking, valve means for controlling the rate of flow of fluid to the brake cylinder to provide an initial fast rate of flow of fluid to the brake cylinder and then a slower rate of flow of fluid to the brake cylinder, said valve means being operable by brake cylinder pressure, means resisting the operation of said valve means until the brake cylinder pressure has been increased to a certain degree when the equipment is conditioned for empty braking, and means operable upon the operation of the first mentioned means to condition the equipment for load braking to increase the resistance offered to the operation of said valve means.

5. In an empty and load fluid pressure brake equipment, the combination with a brake cylinder, a brake pipe, and a valve device operated upon a reduction in brake pipe pressure for supplying fluid under pressure to the brake cylinder, of means operable to condition the equipment for either empty or load braking, valve means for controlling the rate of flow of fluid to the brake cylinder to provide an initial fast rate of flow of fluid to the brake cylinder and then a slower rate of flow of fluid to the brake cylinder, said valve means being operable by brake cylinder pressure, a spring resisting the operation of said valve means until the brake cylinder pressure has been increased to a certain degree when the equipment is conditioned for empty braking, and an additional spring movable upon the operation of the first mentioned means to condition the equipment for load braking into cooperative relation with said valve means to increase the resistance offered to the operation of said valve means.

6. In an empty and load fluid pressure brake equipment, the combination with a brake cylinder, a brake pipe, and a valve device operated upon a reduction in brake pipe pressure for supplying fluid under pressure to the brake cylinder, of valve mechanism operable manually for conditioning the equipment for either empty or load braking, valve means for controlling the rate of flow of fluid to the brake cylinder to provide an initial fast rate of flow of fluid to the brake cylinder and then a slower rate of flow of fluid to the brake cylinder, said valve means being operable by brake cylinder pressure, means rendering said valve means responsive to a certain brake cylinder pressure when the equipment is conditioned for empty braking, and means operable upon the operation of said valve mechanism for conditioning the equipment for load braking to render said valve means responsive only to a higher brake cylinder pressure.

7. In an empty and load fluid pressure brake equipment, the combination with a brake cylinder, a brake pipe, and a valve device operated upon a reduction in brake pipe pressure for supplying fluid under pressure to the brake cylinder, of means operable for selectively conditioning the equipment for either empty or load braking, valve means for controlling the rate of flow of fluid to the brake cylinder to provide an initial fast rate of flow of fluid to the brake cylinder and then a slower rate of flow of fluid to the brake cylinder, said valve means being operable by brake cylinder pressure, a spring rendering said valve means responsive to a certain brake cylinder pressure when the equipment is conditioned for empty braking, and means operable upon the operation of the first mentioned means in conditioning the equipment for load braking for additionally loading said valve means to render the valve means responsive only to a higher brake cylinder pressure.

8. In an empty and load fluid pressure brake equipment, the combination with a brake cylinder, a brake pipe, and a valve device operated upon a reduction in brake pipe pressure for supplying fluid under pressure to the brake cylinder, of valve mechanism operable manually for conditioning the equipment for either empty or load braking, valve means for controlling the rate of flow of fluid to the brake cylinder to provide an initial fast rate of flow of fluid to the brake cylinder and then a slower rate of flow of fluid to the brake cylinder, said valve means being operable by brake cylinder pressure, a spring rendering said valve means responsive to a certain brake cylinder pressure when the equipment is conditioned for empty braking, and a spring assemblage movable upon the operation of the valve mechanism in conditioning the equipment for load braking into engagement with said valve means for rendering the valve means responsive only to a higher brake cylinder pressure.

9. In an empty and load fluid pressure brake equipment, the combination with a brake cylinder, a brake pipe, and a valve device operated upon a reduction in brake pipe pressure for supplying fluid under pressure to the brake cylinder, of means operable to condtion the equipment for either empty or load braking, valve mechanism for controlling the rate of flow of fluid to the brake cylinder to provide an initial fast rate of flow of fluid to the brake cylinder and then a slower rate of flow of fluid to the brake cylinder, said valve mechanism being operable by brake cylinder pressure, means adapted to be conditioned to render said valve mechanism responsive to a certain brake cylinder pressure for empty braking and adapted to be conditioned to render said valve mechanism responsive to a different brake cylinder pressure for load braking, and means for operating the first mentioned means and for at the same time conditioning the second mentioned means.

10. In an empty and load fluid pressure brake equipment, the combination with a brake cylinder, a brake pipe, and a valve device operated upon a reduction in brake pipe pressure for supplying fluid under pressure to the brake cylinder, of means operable to condition the equipment for either empty or load braking, valve mechanism for controlling the rate of flow of fluid to the brake cylinder to provide an initial fast rate of flow of fluid to the brake cylinder and then a slower rate of flow of fluid to the brake cylinder, said valve mechanism being operable by brake cylinder pressure, means operative for selectively conditioning said valve mechanism to resopnd to one or another of a plurality of chosen brake cylinder pressures and manually operable means for simultaneously operating both of said means.

11. In an empty and load fluid pressure brake equipment, the combination with a brake cylinder, a brake pipe, and a valve device operated upon a reduction in brake pipe pressure for supplying fluid under pressure to the brake cylinder, of means operative for conditioning the equipment for either empty or load braking, valve means for controlling the rate of flow of fluid to the brake cylinder to provide an initial fast rate of flow of fluid to the brake cylinder and then a slower rate of flow of fluid to the brake cylinder, said valve means being operable by brake cylinder pressure, means operative for conditioning said valve means to respond to a certain brake cylinder pressure for empty braking and for conditioning the valve means to respond to a different brake cylinder pressure for load braking and means for simultaneously operating both of said conditioning means.

12. In an empty and load fluid pressure brake equipment, the combination with a brake cylinder, a brake pipe, and a valve device operated upon a reduction in brake pipe pressure for supplying fluid under pressure to the brake cylinder, of means operative for conditioning the equipment for either empty or load braking, valve means for controlling the rate of flow of fluid to the brake cylinder to provide an initial fast rate of flow of fluid to the brake cylinder and then a slower rate of flow of fluid to the brake cylinder, said valve means being operable by brake cylinder pressure, a spring resisting the operation of said valve means until the brake cylinder pressure has been increased to a certain degree when the equipment is conditioned for empty braking, an additional spring movable into cooperative relation with said valve means to incerase the resistance offered to the operation of said valve means, a plunger for moving said additional spring, and manually operable means for actuating said means to condition the equipment for load braking and for at substantially the same time actuating said plunger.

13. In a fluid pressure brake, the combination with a brake cylinder, a brake pipe, an auxiliary reservoir and a valve device operated upon a reduction in brake pipe pressure for supplying fluid under pressure from the auxiliary reservoir to the brake cylinder, of valve means operative by brake cylinder pressure for controlling the rate of flow of fluid to the brake cylinder to provide an initial fast rate of flow of fluid to the brake cylinder and then a slower rate of flow of fluid to the brake cylinder, means rendering said valve means responsive to a certain brake cylinder pressure, loading means movable into engagement with said valve means for rendering said valve means responsive only to a higher brake cylinder pressure, a normally charged supplemental reservoir, a valve movable to establish communication through which fluid under pressure is supplied from the supplemental reservoir to the brake cylinder, and means for simultaneously moving said loading means and valve.

14. In a fluid pressure brake, the combination with a brake cylinder, a brake pipe, an auxiliary reservoir and a valve device operated upon a reduction in brake pipe pressure for supplying fluid under pressure from the auxiliary reservoir to the brake cylinder, of valve means operative by brake cylinder pressure for controlling the rate of flow of fluid to the brake cylinder to provide an initial fast rate of flow of fluid to the brake cylinder and then a slower rate of flow of fluid to the brake cylinder, means rendering said valve means responsive to a certain brake cylinder pressure, a reservoir supplemental to the auxiliary reservoir and normally out of communication with the auxiliary reservoir, means movable into engagement with said valve means for rendering the valve means responsive only to a higher brake cylinder pressure, and means operable simultaneously with the last mentioned means for establishing communication between the auxiliary reservoir and supplemental reservoir.

15. In a fluid pressure brake, the combination with a brake cylinder, a brake pipe, an auxiliary reservoir and a valve device operated upon a reduction in brake pipe pressure for supplying fluid under pressure from the auxiliary reservoir to the brake cylinder, of valve means operative by brake cylinder pressure for controlling the rate of flow of fluid to the brake cylinder to provide an initial fast rate of flow of fluid to the brake cylinder and then a slower rate of flow of fluid to the brake cylinder, means rendering said valve means responsive to a certain brake cylinder pressure, a reservoir supplemental to the auxiliary reservoir and normally out of communication with the auxiliary reservoir, means movable into engagement with said valve means for rendering the valve means responsive only to a higher brake cylinder pressure, means operable to establish communication between the auxiliary reservoir and supplemental reservoir and means for simultaneously operating both of the last mentioned means.

16. In a fluid pressure brake, the combination with a brake cylinder, a brake pipe, an auxiliary reservoir and a valve device operated upon a reduction in brake pipe pressure to supply fluid under pressure to the brake cylinder, of valve means for controlling the rate of flow of fluid to the brake cylinder to provide an initial inshot of fluid to the brake cylinder and then a slow flow of fluid to the brake cylinder, said valve means being adapted to be conditioned to provide for the inshot of a certain amount of fluid under pressure to the brake cylinder and also being adapted to be conditioned to provide for the inshot of a greater amount of fluid to the brake cylinder, a supplemental reservoir from which fluid under pressure is supplied to augment the auxiliary reservoir pressure when said valve means is conditioned to provide the last mentioned inshot of fluid to the brake cylinder, and means operative to close communication between the supplemental reservoir and auxiliary reservoir when said valve means is conditioned to provide the first mentioned inshot of fluid to the brake cylinder.

17. In an empty and load fluid pressure brake, the combination with a brake cylinder, a brake pipe, an auxiliary reservoir, and a valve device operated upon a reduction in brake pipe pressure to supply fluid under pressure from the auxiliary reservoir to the brake cylinder, of valve means operable to control the rate of flow of fluid to the brake cylinder to first provide for an inshot of fluid to the brake cylinder and then provide for a more gradual flow of fluid to the brake cylinder, means operable to condition said valve means to provide a greater inshot of fluid to the brake cylinder in loaded car operation than in empty car service, and means augmenting auxiliary reservoir pressure when said valve means is conditioned for loaded car operation.

18. In an empty and load fluid pressure brake, the combination with a brake cylinder, a brake pipe, an auxiliary reservoir, and a valve device operated upon a reduction in brake pipe pressure to supply fluid under pressure from the auxiliary reservoir to the brake cylinder, of valve means operable to control the rate of flow of fluid to the brake cylinder to first provide for an inshot of fluid to the brake cylinder and then provide for a more gradual flow of fluid to the brake cylinder, means operable to condition said valve means to provide a greater inshot of fluid to the brake cylinder in loaded car operation than in empty car service, a supplemental reservoir, and means establishing communication between the supplemental reservoir and auxiliary reservoir when said valve means is conditioned for loaded car operation.

19. In a fluid pressure brake, the combination with an empty brake cylinder and a load brake cylinder, a brake pipe, and a valve device operated upon a reduction in brake pipe pressure for supplying fluid under pressure to the empty brake cylinder, of valve mechanism for controlling the rate of flow of fluid to the empty brake cylinder and subject on one side to brake cylinder pressure and having a position in which the rate of flow of fluid supplied by said valve device is restricted and in which a communication is established through which fluid under pressure supplied by said valve device is adapted to flow, means rendering said valve mechanism responsive to a certain brake cylinder pressure, means operative to render said valve mechanism responsive to only a higher brake cylinder pressure, and means operative with the second mentioned means for connecting said communication to the load brake cylinder.

20. In a fluid pressure brake, the combination with an empty brake cylinder and a load brake cylinder, a brake pipe, and a valve device operated upon a reduction in brake pipe pressure for supplying fluid under pressure to the empty brake cylinder, of valve mechanism for controlling the rate of flow of fluid to the empty brake cylinder and subject on one side to brake cylinder pressure and having a position in which the rate of flow of fluid supplied by said valve device is restricted and in which a communication is established through which fluid under pressure supplied by said valve device is adapted to flow, a spring for rendering said valve mechanism responsive to certain brake cylinder pressure, a spring movable into engagement with said valve mechanism for rendering the mechanism responsive only to a higher brake cylinder pressure, means for moving said spring into engagement with the valve mechanism, and means operative with said means for opening said communication to the load brake cylinder.

21. In a fluid pressure brake, the combination with an empty brake cylinder, a load brake cylinder, a brake pipe, an auxiliary reservoir and a valve device operated upon a reduction in brake pipe pressure for supplying fluid under pressure from the auxiliary reservoir to the empty brake cylinder, of valve mechanism for controlling the rate of flow of fluid to the empty brake cylinder and operative by brake cylinder pressure to restrict the flow of fluid to the brake cylinder and to establish communication through which fluid under pressure is supplied by said valve device to a normally closed load brake cylinder passage, means rendering said valve mechanism responsive to a certain low brake cylinder pressure, a supplemental reservoir, means operative to render said valve mechanism responsive only to a higher brake cylinder pressure, and means operable simultaneously with the second mentioned means for connecting said supplemental reservoir with the auxiliary reservoir and opening the communication to said load brake cylinder.

22. In a fluid pressure brake, the combination with an empty brake cylinder, a load brake cylinder, a brake pipe and a valve device operated upon a reduction in brake pipe pressure for supplying fluid under pressure to the empty brake cylinder, valve mechanism normally permitting an inshot of fluid to the empty brake cylinder and operable by brake cylinder pressure for limiting the degree of said inshot of fluid and restricting the flow of fluid supplied by said valve device and for establishing a communication through which fluid under pressure is adapted to be supplied to the load brake cylinder, a normally closed valve preventing the flow of fluid through said communication to the load brake cylinder, means rendering said valve mechanism responsive to a certain low brake cylinder presure, means operable into engagement with said valve mechanism for rendering the valve mechanism responsive only to a higher brake cylinder pressure, and means for simultaneously opening said normally closed valve and moving the second mentioned means.

23. In an empty and load fluid pressure brake equipment, the combination with a brake cylinder, a brake pipe, and a valve device operated upon a reduction in brake pipe pressure to supply fluid under pressure to the brake cylinder, of a valve having a position for conditioning the equipment for empty braking and having another position for conditioning the equipment for load braking, valve means operable to control the rate of flow of fluid to the brake cylinder to first provide for an inshot of fluid to the brake cylinder and then provide for a more gradual flow of fluid to the brake cylinder, means operable to condition said valve means to provide a greater inshot of fluid to the brake cylinder in load braking than in empty braking, and means for simultaneously operating the conditioning valve and conditioning means for either empty or load braking.

24. In an empty and load fluid pressure brake equipment, the combination with a brake cylinder, a brake pipe, and a valve device operated upon a reduction in brake pipe pressure to supply fluid under pressure to the brake cylinder, of a valve having a position for conditioning the equipment for empty braking and having another position for conditioning the equipment for load braking, means operative to position said valve, valve means operable to control the rate of flow of fluid to the brake cylinder to first provide for an inshot of fluid to the brake cylinder and then provide for a more gradual flow of fluid to the brake cylinder, and means operated by the valve positioning means to condition said valve means to limit the amount of inshot of fluid to the brake cylinder according to the position with said valve.

WILLIAM E. DEAN.